Sept. 2, 1924.  1,507,359
H. W. ANGSTEN
WHEEL CONSTRUCTION
Filed July 27, 1922
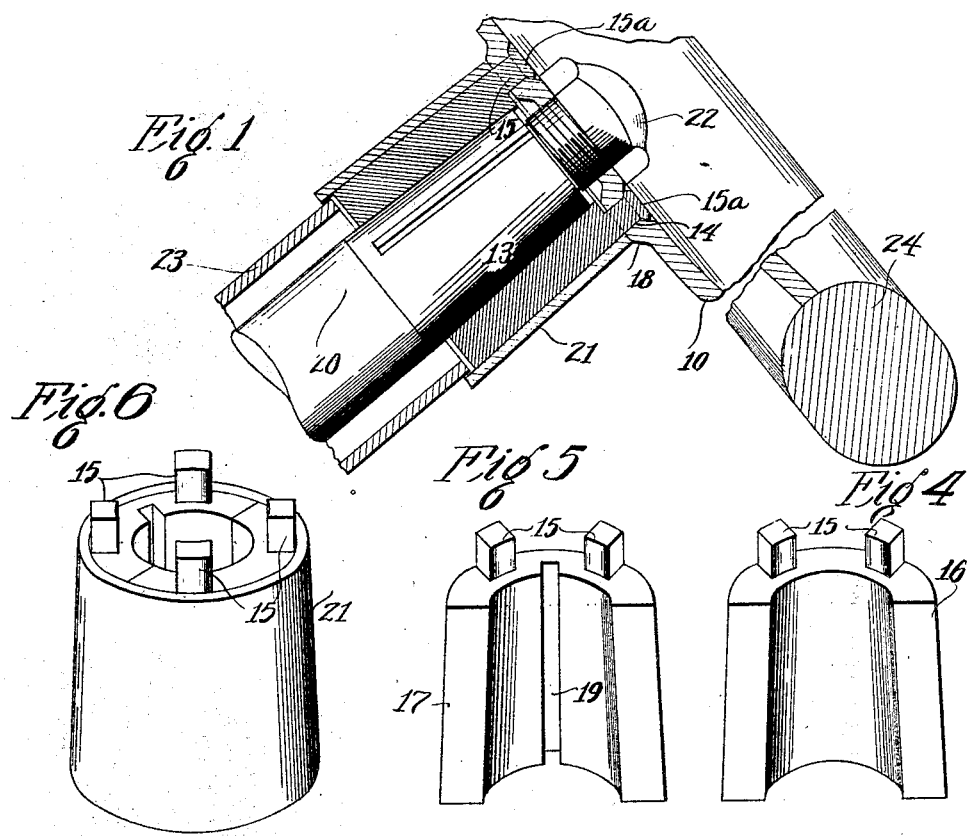
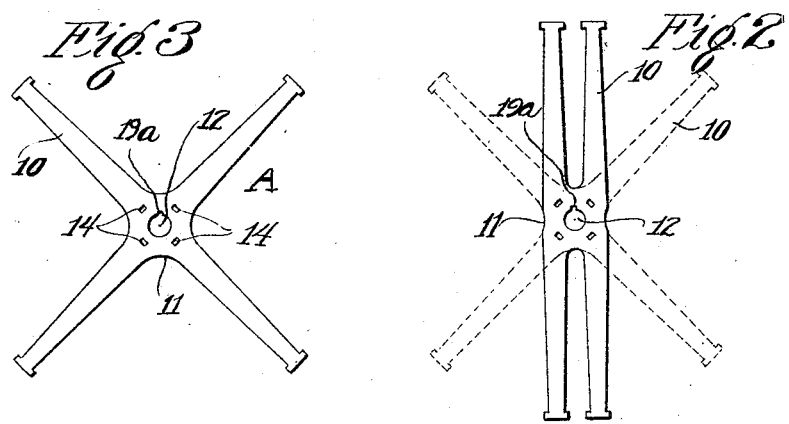
Witness
J. L. Brown
Inventor
Henry W. Angsten
By Sprinkle Hopkins mena
Attys.

Patented Sept. 2, 1924.

1,507,359

UNITED STATES PATENT OFFICE.

HENRY W. ANGSTEN, OF MICHIGAN CITY, INDIANA.

WHEEL CONSTRUCTION.

Application filed July 27, 1921. Serial No. 488,039.

*To all whom it may concern:*

Be it known that I, HENRY W. ANGSTEN, a citizen of the United States, residing at Michigan City, in the county of Laporte and State of Indiana, have invented certain new and useful Improvements in Wheel Construction.

The invention relates to an improved construction for wheels and is applicable to wheels of various types such as wheels for steering columns of motor vehicles and various devices wherein wheels are required.

The primary object of the invention is to produce a wheel of maximum strength by forming the spider of the wheel with a central body portion and the spokes radiating therefrom from a single piece of metal, thereby preserving the maximum strength of the metal of which the wheel is composed.

A further object of the invention is to provide a novel construction of wheel spider blanked from sheet metal together with improved hub construction therefor.

A further object of the invention is to provide a new and improved method of constructing wheels.

It is a further object of the invention to so form the blank from which the spokes and central portion of the wheel are struck as to reduce the amount of waste material for forming a wheel to the minimum.

It is a further object of the invention to provide novel means for securing the spider or spokes and central portion of a wheel to the hub thereof.

It is a further object of the invention to provide a hub portion for a wheel which may be economically, positively and securely united with the spider portion thereof in such manner as to stand the maximum strain thereon.

It is a still further object of the invention to provide a wheel having a hub which may be keyed to a shaft throughout the length of the hub.

Other objects of the invention will appear from the following description which is directed to the preferred embodiment of the invention, which is illustrated in the drawings forming a part of the specification, in which Fig. 1 is a sectional view of my improved wheel as applied to the steering column of an automobile with portions of the wheel broken away.

Fig. 2 shows a blank of sheet metal in full lines from which the spider portion of my improved wheel may be formed.

Fig. 3 shows the spider of my improved wheel formed from the blank shown in Fig. 2.

Figs. 4 and 5 are perspective views of the members of which my improved hub is composed, Fig. 5 showing the keyway.

Fig. 6 shows the assembled hub of my improved wheel.

In the interest of economy in constructing the body or spider portion of my improved wheel I use a relatively narrow blank in the form of an elongated letter H, as shown in full lines in Fig. 2, struck from a sheet of metal spreading the arms of the blank to an angle of ninety degrees (90°), as shown in dotted lines Fig. 2, thus resulting in the formation of a spider designated generally as A (Fig. 3), spokes 10, a central portion 11 with a central aperture 12 therethrough for the reception therethrough of steering tube 13, the central body portion 11 having apertures 14 therethrough for the reception of dowels 15 carried by semi-circular hub members 16 and 17, the apertures 14 being countersunk in the central body portion of the spider, as indicated at 18, Fig. 1, in order that the heads of dowels 15 may be riveted over and brought flush with the face of the central body portion 11, as shown at 15ª Fig. 1, in the operation of assembling the body or spider portion of the wheel with the hub thereof. Semi-circular member 17 has a keyway 19 extending longitudinally thereof and adapted to register with keyway 19ª, in the central portion 11 of spider A, for the reception therein of a key 20 carried by shaft 13 for positively locking the hub thereto. Semi-circular members 16 and 17 are given a slightly tapering or wedge-like form toward their upper or dowel ends, thereby forming a slightly conically shaped cylinder when assembled as shown in Fig. 6 and are rigidly held in their assembled relation by the conically shaped collar 21. It will be noted by reference to Fig. 1 that the upper portion of steering tube 13 is slightly conical in shape and is screw threaded at its upper end for the reception thereon of nut 22 for securing the parts in assembled relation. Steering tube 13 is rotatably mounted within the exterior tube 23 as is usual in the construction of steering devices for motor vehicles, the rim or hand grip of the steering wheel being designated by the reference numeral 24.

From the foregoing it will be seen that I am enabled to form the central or spider portion of my improved wheel from a relatively narrow strip of metal with a minimum amount of waste. After striking the blank in the form of an elongated H from a sheet of metal I spread the arms from the position shown in full lines Fig. 2 to the position shown in dotted lines, which results in the formation of the spider A, which is assembled with the assembled hub portion, as shown in Fig. 6, by inserting the dowels 15 through apertures 14 and riveting over, thus resulting in the economical construction of a rigid, durable wheel possessing the maximum of strength with a minimum amount of metal.

In order that the invention might be understood the details of the preferred embodiment have been shown and particularly described but it is not desired to be limited to the mere details of construction, for it will be apparent that persons skilled in the art may resort to various modifications without departing from the purpose and spirit of the invention.

I claim:

1. A wheel having the spokes thereof struck from a single piece of sheet metal and the hub thereof formed of a plurality of wedge shaped members.

2. A wheel having the spokes thereof formed of a single piece of sheet metal and a cylindrical hub having portions formed integrally therewith and adapted to have said portions upset for riveting said spokes to said hub.

3. A wheel having the spider thereof integrally formed, a cylindrical hub comprising a plurality of sections which are arcuate in cross section, and means for holding said sections in cylindrical form.

4. A wheel having the spider portion thereof formed of one piece of metal, a cylindrical hub comprising two semi-circular members, and means for retaining said members in assembled relation.

5. A wheel having a sheet metal spider portion, a cylindrical hub portion comprising a plurality of members, arcuate in cross section, a collar surrounding said members, said hub having a keyway in the inner face thereof extending between its ends.

6. A wheel having a sheet metal spider portion struck from a single piece of metal, said spider having apertures therethrough, a hub portion comprising a plurality of sections, dowels carried by said sections and adapted to engage said apertures.

7. A wheel having the spider portion thereof struck from a single piece of metal, the central portion of said spider having countersunk apertures therethrough, a hub comprising a plurality of sections, dowels carried by said sections and adapted to engage said apertures, and a sleeve surrounding said sections.

8. The combination with a conically shaped shaft, a cylindrical hub comprising a plurality of members arcuate in cross section, and means for wedging said members into cylindrical form.

9. The combination with a conically shaped shaft, a cylindrical hub comprising a plurality of wedge shaped members arcuate in cross section, and means for retaining said members in the form of a conically shaped cylinder.

10. A steering wheel for motor cars and the like, comprising a spider consisting of a central perforated portion and radiating spokes integral therewith, said central perforated portion being provided with a plurality of spaced perforations around said central perforations, a detachable hub portion provided with a central perforation and having a plurality of dowels at one end thereof adapted to register with the said perforations around the central perforation of the spider hub and being adapted to have the outer extremities thereof upset whereby to secure the spider and the said hub portion together.

In testimony where I have signed my name to this specification, in the presence of two subscribing witnesses, on this 15th day of July A. D. 1921.

HENRY W. ANGSTEN.

Witnesses:
HOWARD J. YOUNG,
D. B. LEVENBERG.